No. 780,448. Patented January 17, 1905.

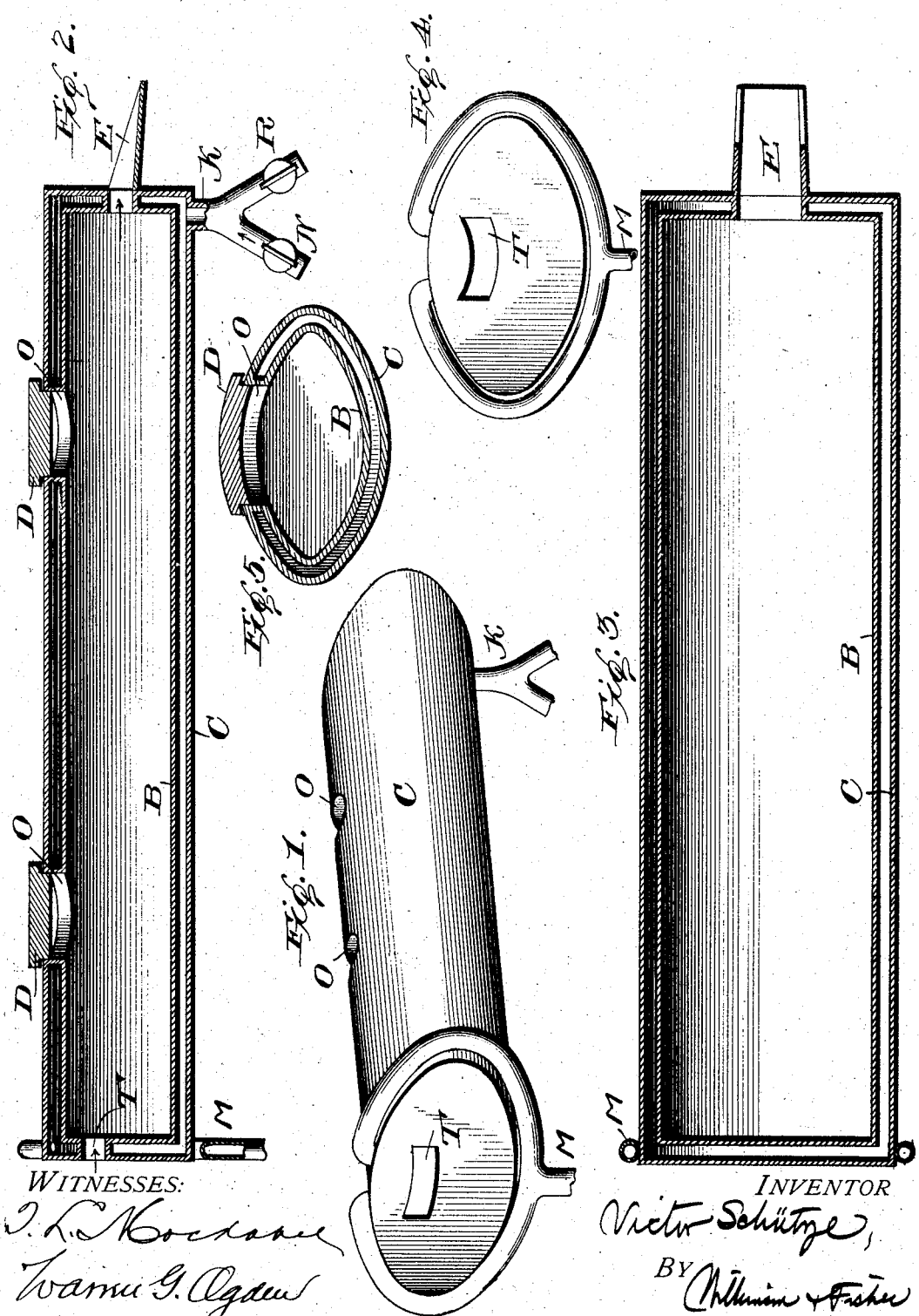

UNITED STATES PATENT OFFICE.

VICTOR SCHÜTZE, OF RIGA, RUSSIA.

METHOD OF CRYSTALLIZATION.

SPECIFICATION forming part of Letters Patent No. 780,448, dated January 17, 1905.

Application filed March 18, 1904. Serial No. 198,831.

*To all whom it may concern:*

Be it known that I, VICTOR SCHÜTZE, a subject of the Czar of Russia, residing at Riga, Russia, have invented certain new and useful Improvements in Methods of Crystallization; and I do hereby declare the following to be a full, clear, and exact description of the invention, such as will enable others skilled in the art to which it appertains to make and use the same.

My invention relates to improvements in methods of crystallization, and is more especially adapted for the obtaining of crystals from a solution which has been concentrated at a temperature of 212° Fahrenheit or over.

In the accompanying drawings, which illustrate an apparatus for carrying out my invention, Figure 1 is a perspective view thereof. Fig. 2 is a longitudinal vertical section thereof. Fig. 3 is a longitudinal horizontal section thereof. Fig. 4 is an end view thereof, and Fig. 5 is a cross-section of the same.

It is well known that crystallization takes place more promptly when the mother-liquor is kept in movement. All methods of crystallizing on a commercial scale with which I am familiar labor under the difficulty that perfect crystals can be obtained only from solutions concentrated at a low temperature, never over 106° Fahrenheit, while in case of wholesale manufacturing it is desirable to work with solutions concentrated at the highest possible temperature. If a solution which is concentrated at 212° Fahrenheit until it becomes saturated is allowed to pass through an open vessel, the matter in solution will as the liquor becomes cooler be deposited in an uncrystallized powdery form, which will not increase in size, whereas if perfect crystals were formed, no matter how small, they would gradually increase in size. The separation of regular well-finished crystals in the case mentioned takes place only toward the end of the apparatus after the liquor has become considerably cooler and much less concentrated, and in an apparatus such as mentioned it is impracticable to obtain regular well-finished crystals except toward the very end thereof. The salts will first be deposited in the form of powder, later on in conglomerate lumps only partially crystallized and containing much mother-liquor. My invention is designed to do away with these difficulties and to obtain regular well-finished crystals from a saturated solution concentrated at a high heat, and is especially adapted for wholesale manufacturing.

To carry out my method perfectly, it is necessary that the concentrated solution should be cooled slowly and evenly at the same time, the result being that the small crystals deposited where the solution is hottest will gradually increase in size and the crystallization be perfected.

In the accompanying apparatus for carrying out my method, B represents an elliptical vessel into which the boiling saturated solution is delivered through the opening T and after depositing the salts held thereby in the form of crystals passes out through the trough E. The vessel B is surrounded by a similarly-shaped larger vessel C, provided with an inlet-pipe K for the entrance of the cooling liquid and a discharge M. The pipe K is forked, and in one of the forks, which supplies hot water to the apparatus, a stop-cock R is provided, and in the other fork, which supplies cold water to the apparatus, a stop-cock N is provided.

O represents openings which extend through both of the vessels for the purpose of observing the progress of the crystallization and for cleaning the apparatus. Ordinarily these openings are closed by the covers D.

In carrying out my improved method the stop-cock R is opened and the space between the vessels B and C is filled with hot water having a temperature about 212° Fahrenheit until the liquid which passes out the pipe M shows a temperature a few degrees lower than that of the salt solution which comes in through the opening T. The stop-cock R is then closed and the stop-cock N partially opened, allowing a very slow flow of cold water through the pipe K into the space between the vessels B and C. The flow of water through the apparatus is so regulated that when it passes out from the tube M it is a few degrees lower in temperature than the solution entering through the opening T. The solution from which the crystals are to be extracted is then allowed to flow slowly through the opening T. Being a little warmer than the side of the vessel where it first strikes, this solution immediately begins to deposit small but fully-finished crystals on the bottom of the vessel B just below the opening T. The solution as it passes through the vessel B becomes less and less concentrated and comes in contact successively with colder and colder portions of the vessel B, depositing more and more crystals, which crystals gradually grow in size as more and more of the solution flows over them, until finally the mother-liquor passes out of the trough E, having deposited a very large percentage of the salts therein dissolved. By regulating the temperature of the cooling liquid, which is done by regulating the flow thereof, the amount of salts which the mother-liquor still contains as it passes out of the apparatus can be regulated to a nicety. Furthermore, by this method it is possible to separate from each other different salts contained in the same liquid. For example, supposing we have a solution saturated at 212° Fahrenheit and containing equal parts of sulfate of copper and sulfate of iron, it is easy to find out after drawing up the curves of solubility of these salts what temperature of the cooling liquid is necessary in order to prevent one of said salts from being crystallized and practically crystallizing the whole or a large part of the other salt.

By my method the vessel B becomes gradually more and more filled up with well-finished crystals, which after having obtained the desired size pass out through the trough E, together with the mother-liquor, which of course has that degree of concentration which is determined by the temperature of the apparatus at the outlet end. The crystals thus obtained are placed on sieves, and after the mother-liquor has drained off they are washed with a very small quantity of water and then passed into a centrifugal machine and dried, making them ready for commercial use.

Having thus described my invention, what I claim as new, and desire to secure by Letters Patent, is—

1. The method of obtaining crystals, which consists in causing a hot concentrated solution to pass slowly along, and periodically subjecting said solution in its passage to successively-increasing degrees of cold, substantially as described.

2. The method of obtaining crystals, which consists in causing a hot concentrated solution to pass slowly along and to be subjected in its passage to the action of a cooling liquid slightly cooler than itself at the beginning of said passage and gradually becoming colder, substantially as described.

3. The method of obtaining crystals, which consists in causing a hot concentrated solution to pass slowly through a vessel surrounded by a jacket containing cooling liquid, and regulating the supply of said cooling liquid so that the temperature thereof shall be slightly below that of the solution where it enters the vessel and gradually lessen in temperature up to the point where the cooling liquid enters the jacket, substantially as described.

In testimony whereof I affix my signature in presence of two witnesses.

VICTOR SCHÜTZE.

Witnesses:
 CONSTANTIN PYCHLAU,
 ARTHUR BULLA.